United States Patent [19]

Thayer et al.

[11] 4,343,844

[45] Aug. 10, 1982

[54] SHRINKABLE SLEEVE ADAPTED FOR CABLE AND TUBING GAS FLOW BLOCKING

[75] Inventors: Richard S. Thayer, Bainbridge; William J. Herbert, Mantua; Gary S. Klein, Bedford Heights, all of Ohio

[73] Assignee: Eaton Corporation, Cleveland, Ohio

[21] Appl. No.: 207,851

[22] Filed: Nov. 17, 1980

[51] Int. Cl.³ .................... B32B 1/08; H02G 15/02
[52] U.S. Cl. .......................... 428/36; 138/DIG. 5; 156/86; 174/74 A; 174/DIG. 8; 428/188; 428/913
[58] Field of Search .................. 428/36, 188, 113; 156/86; 264/230; 174/DIG. 8, 74 A; 138/DIG. 5; 403/273; 339/30; 29/447, 450

[56] References Cited

U.S. PATENT DOCUMENTS 3,949,110 4/1976 Nakajima et al. .................. 428/36
3,957,382 5/1976 Greuel, Jr. et al. ................ 156/86

FOREIGN PATENT DOCUMENTS 720962 12/1954 United Kingdom ............ 174/74 A

Primary Examiner—Paul J. Thibodeau
Attorney, Agent, or Firm—C. H. Grace; A. Chrow

[57] ABSTRACT

A compact one-piece shrinkable sleeve of minimal outside diameter made from either a resilient material or a heat shrinkable material having elastic memory and adapted to be secured to the end of an electrical cable and/or tubing bundle having one or more electrical conductors and/or tubes extending therefrom to provide a barrier to the flow of gas or vapors therethrough. The sleeve contains a cavity at one end thereof that when the sleeve is in an expanded state is adapted to receive the end of the bundle. The sleeve contains one or more internal channels at the opposite end thereof that are separated from each other by walls that are directly or indirectly integrally related to the wall of the remainder of the sleeve and are adapted to permit the one or more conductors and/or tubes to extend therethrough from the bundle end in the cavity.

17 Claims, 7 Drawing Figures

SHRINKABLE SLEEVE ADAPTED FOR CABLE AND TUBING GAS FLOW BLOCKING

This invention relates generally to a means for blocking the flow of gas and vapors through a bundle having one or more components such as electrical conductors and/or tubes extending from the end thereof and more particularly to the use of a shrinkable sleeve made from a recoverable material having elastic memory that is adapted to enclose the outer surface of the end of an electrical cable and/or tubing bundle and encircle each of the conductors and/or tubes by means of one or more internal open-ended channels disposed within the sleeve that are adapted to contain individual conductors and/or tubes or groups thereof in the combinations desired such that, when the sleeve is caused to shrink onto the end of the bundle to secure the engagement therebetween, the walls of the channel constrict against the respective conductors and/or tubes contained therein in such a manner as to provide an effective barrier of minimal outside dimension to the flow of gas and vapors through the bundle.

BACKGROUND OF THE INVENTION

It sometimes occurs that electrical cable and/or tubing bundles are required to provide electrical and/or material transfer or pneumatic signals between two locations in such a manner that the cable and/or tubing bundle does not act as a conduit for the transfer of the vaporous or gaseous environment of one location to the other. Of particular importance are situations where one location is desigated as a non-hazardous location and the other location is designated as hazardous such as, for example, where one location is an electrical control room and the other is a location having an explosive vaporous or gaseous environment. Under such circumstances, it is vital that the cable and/or tubing bundle does not act as a conduit for transfer of the explosive gas or vapor to the electrical control location so as to prevent the possibility of its ignition from an electrical spark or other source of ignition.

Authorized means for the prevention of such gas flow transfer occurrences is established under Article 501 of the National Electrical Code of which Articles 501-b and -e respectively cover conduit and electrical cable seal connections between a Class 1 Division 2 hazardous location and a non-hazardous location.

The problem of preventing gaseous flow through electrical cable and/or tubing bundles has commonly been solved in the past by filling the open spaces or interstices between the electrical wires and/or tubes within a bundle with a sealing compound approved for the purpose or alternatively to use approved sealing fittings at the ends of the cable and/or bundle. Two of the advantages of sealing the end of an electrical cable and/or tubing bundle versus filling them with a sealing compound are that the complications of filling during the manufacturing process are eliminated and the cable and/or bundle is necessarily considerably lighter in the absence of such sealing compound throughout the entire length of the electrical cable or tubing bundle.

One of the methods used in the past to seal the ends of an electrical cable is by the use of heat shrinkable and cap break-outs such as disclosed in U.S. Pat. No. 3,949,110. Although such break-outs may be used to advantage they have the disadvantages of: (1) having an enlarged outside dimension due to the bulkiness of the exterior shrunken covering extending about each conductor from the end of the cap; (2) require that the covering about each conductor or groups of conductors be shrunken individually by the use of heat; and (3) are unable to provide the number of outlets per unit of cross-sectional area associated with the sleeve of the present invention.

Another method that might be used to seal the ends of an electrical cable is the combination of a heat recoverable member and a fusible insert such as respectively disclosed in U.S. Pat. Nos. 3,396,460 and 4,206,786. The method however requires the use of a separate fusible insert that melts to fill the air spaces and voids between conductors when the heat recoverable member is caused to shrink by the application of heat and does not offer a compact one-piece recoverable sleeve having internal walls separating the conductors and providing both strength and support thereto.

Another method for sealing interconnections between electrical wire ends is disclosed in U.S. Pat. No. 3,525,799 where a heat recoverable sleeve is used in conjunction with an internal polymeric material about the conductors such that, when the sleeve is shrunken under heat, the polymeric or solid material melts and seals the area between the sleeve and the conductor. The disadvantages of such method are the expense and inconvenience of having to inventory and handle a multicomponent system and that such method would apt to be extremely complex when a plurality of electrical conductors and/or tubes are involved.

A method of aligning a plurality of pins within a heat recoverable sleeve for respectively connecting to each of a plurality of electrical conductors is disclosed in U.S. Pat. No. 4,022,519. Although the pins are aligned by use of molded blocks contained within the sleeve, the blocks do not have the ability to shrink about the pins during the process of shrinking the sleeve and thus may not provide a suitable barrier to the flow of gas.

SUMMARY OF THE INVENTION

Accordingly, it is an object of this invention to provide a compact one-piece shrinkable unbranched sleeve of minimal outside dimension for sealing the ends of an electrical cable and/or tubing bundle to prevent the flow of gas and vapors therethrough.

It is a further object of this invention to provide a compact one-piece shrinkable sleeve of minimal outside dimension that provides an effective barrier for the prevention of the flow of gas and vapors through open spaces and interstices contained within a bundle and that further provides a means of containing and aligning a plurality of conductors and/or tubes within the sleeve before they emerge therefrom.

It is a feature of this invention to provide a compact one-piece shrinkable sleeve of minimal outside dimension having one or more open-ended channels disposed internally within the sleeve that are adapted to contain and align individual electrical conductors and/or tubes or groups thereof extending from the end of the bundle and have walls that are adapted to constrict against the conductors and/or tubes when the sleeve is shrunken onto the end of the bundle to secure the engagement therebetween so as to provide an effective barrier to the flow of gas and vapors through any open spaces or interstices between the electrical conductors and/or tubes present within the bundle.

The gas flow barrier means of the present invention provides a compact one-piece shrinkable sleeve of minimal outside dimension having one or more internal open-ended channels disposed therein that are adapted to contain individual electrical conductors and/or tubes or groups thereof in the combinations desired such that, when the sleeve is caused to shrink onto the bundle end to secure the engagement therebetween, the walls of the channels constrict against the conductors and/or tubes to provide an effective barrier against gas flow through the open spaces or interstices within the bundle. The shrinkable sleeve of the present invention further provides for the use of an adhesive or other suitable material to aid in the filling of air spaces and voids associated with the bundle to enhance the securement of the sleeve to the bundle and on the internal surface of the channel walls where such is desired to enhance the sealing engagement between the shrunken channel wall and the electrical conductor or tube or groups thereof contained within the respective channels. The use of an adhesive layer in conjunction with shrinkable members of the type used in the past is well known in the art and was perhaps first disclosed in U.S. Pat. No. 2,790,285 where an adhesive coated shrinkable film is used to seal a bottle cap to prevent tampering.

The shrinkable sleeve of the present invention further includes the non-heat principle of providing a shrinkable member, such as for example disclosed in U.S. Pat. No. 4,070,746, where a shrinkable sleeve made from a resilient material having elastic memory is held in an expanded state by means of a non-recoverable member and caused to shrink by solvating the adhesive and in U.S. Pat. No. 4,179,320 which discloses a recoverable article held in an expanded state by a fracturable outer non-recoverable outer member such that, when the outer is fractured by impact, the recoverable article is able to shrink.

DETAILED DESCRIPTION OF THE PREFERRED EMBODIMENTS

Figure 1:
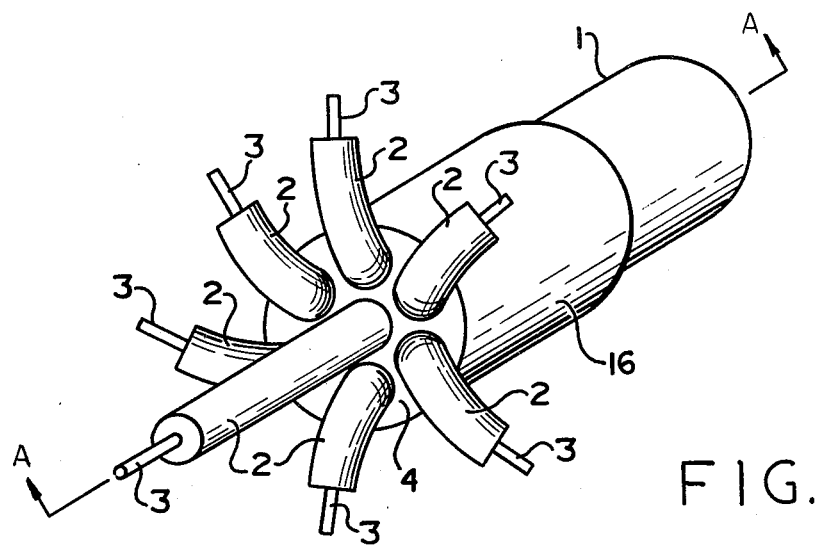
FIG. 1 shows a perspective view of an embodiment of the sleeve of the invention shrunken onto the end of an electrical cable having seven (7) electrical conductors.

FIG. 1 shows an embodiment of the compact one-piece shrinkable sleeve 16 of the invention secured to the end of electrical cable 1. Cable 1 has seven (7) electrical conductors 3 emerging from the end of sleeve 16 that are respectively electrically insulated by means of a layer 2 of suitably selected electrically insulative material disposed about each conductor 3. The plurality of insulated conductors 3 are each individually contained within, and extend through, an open-ended longitudinally extending channel (not referenced) that is contained internally within sleeve 16. The channels 6 (hereinafter described more fully with respect to FIG. 2) are spaced-apart and are separated from each other and enclosed by internal walls 4 (only one wall referenced for simplicity) that are integrally related directly and/or indirectly with the wall forming the remainder of sleeve 16 such that sleeve 16 constitutes a compact one-piece construction.

In the embodiment shown in FIG. 1, as hereinafter more fully described with respect to FIG. 2, sleeve 16 is secured to the end of cable 1 and conductors 3 by means of the end of cable 1 having been inserted into a cavity 8 through an open end of sleeve 16 facing cable 1 and conductors 3 having been individually inserted into and through the respective internal channels 6 disposed at the opposite end of sleeve 16 while sleeve 16 was in an expanded configuration suitably dimensionally sized for the cavity 8 to receive the end of cable 1 and the channels 6 to individually receive insulated conductors 3. Sleeve 16 is made of a recoverable material having elastic memory, hereinafter more fully described, which, when caused to shrink to an original dimensionably stable configuration having a cavity inside diameter smaller than the outside diameter of cable 1 and an inside diameter of the channels 6 smaller than the outside diameter of insulation 2. Sleeve 16 contracts against the outer surface of cable 1 and walls 4 constrict against the outer surface of insulation layers 2 of conductors 3 to provide an effective barrier of minimal outside dimension to the flow of gas or vapors through cable 1.

Figure 2:
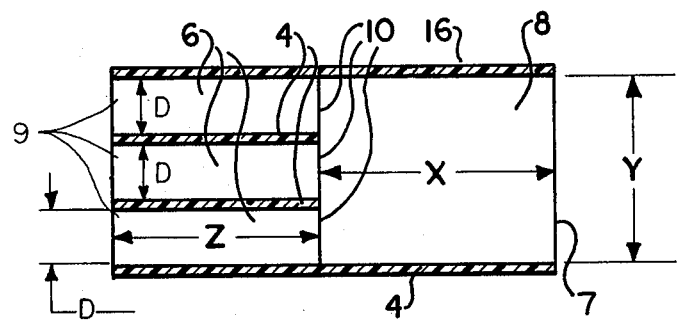
FIG. 2 shows cross-sectional view A-A taken along the longitudinal axis of the sleeve of FIG. 1 without the electrical cable included.

FIG. 2 is a sectional view taken along the longitudinal axis A-A of cable 1 and sleeve 16 with cable 1 and conductors 3 removed for purposes of clarity. Shown in FIG. 2 is sleeve 16 in the shrunken configuration previously described in respect to FIG. 1. Sleeve 16 has an open end 7 for receiving the end of cable 1 into a cavity 8. Cavity 8 is enclosed by wall 4 of sleeve 16 which, in the region of channels 6, is directly or indirectly integrally related with walls 4 separating channels 6 such that sleeve 16 is a compact one-piece construction. Channels 6 each have an opening 10 communicating with cavity 8 and an opening 9 at the end of sleeve 16 opposite the end having opening 7. In the contracted state, cavity 8 has a diameter "y" measured between the internal surfaces of wall 4 of sleeve 16 that is substantially the same as the outside diameter of cable 1. Cavity 8 has a length "x" measured longitudinally along the length of sleeve 16 between opening 7 and openings 10 that is suitable to permit a sufficient length of the end of cable 1 to be inserted into cavity 8 to provide the amount of securement desired when wall 4 of sleeve 16 in the region of cavity 8 is caused to contract against the outer surface of cable 1 to secure the engagement therebetween. In the expanded configuration of sleeve 16, diameter "y" is sufficiently larger than the outside diameter of cable 1 so that cable 1 can be inserted into cavity 8. Channels 6 each have a longitudinal length "z" between openings 9 and 10 that is sufficient to contain the length of the insulated conductor 3 of FIG. 1 that is determined as necessary or desirable for the particular application involved. For example, length "z" can be increased to provide a more effective barrier to gas or vapor flow of higher pressure through cable 1 since lengthening the distance "z" results in lengthening the longitudinal length of walls 4 that separate channels 6 and necessarily causes a greater length of the inner surface of the walls 4 forming any one particular channel 6 to come into contact with the outer surface of insulation layer 2 of conductor 3 of FIG. 1 contained respectively therein when the walls 4 constrict thereagainst during the shrinking process. Channels 6 each have a diameter "D" between the internal surfaces of the walls 4 enclosing them that in the constricted state of sleeve 16 is substantially the same as the outside diameter of insulation layer 2 of FIG. 1.

Each diameter "D" is sufficiently larger than the outside diameter of the respective insulative layer 2 while sleeve 16 is in its expanded state so that each insulated conductor 3 can be inserted into an opening 10 of a particular channel 6 and is able to extend through the channel and emerge from its opening 9 prior to constricting the walls 4 enclosing the particular channel during the shrinking process.

It is to be appreciated that the sleeve of the invention is not limited to the particular embodiment described with respect to FIGS. 1 and 2. Sleeve 16 need not be cylindrical in shape and may have one or more internal channels 6 disposed that are the same as or differ from each other in cross-sectional shape and in length for the particular application involved. For example, the expanded state cross-sectional shape of channels 6 shown in FIG. 5 have been found particularly suitable for providing a substantially circular cross-sectional shape in the shrunken state for the particular embodiment of the sleeve of the invention. There is no requirement that wall 4 be of the same thickness nor that they be uniform in thickness around a particular channel.

By providing internal channels 6 within sleeve 16 for containing the individual conductors and/or tubes the sleeve is able to have a minimal outside dimension and a greater number of outlets per cross-sectional unit area compared to the larger outside dimension associated with prior break-out type and caps that feature individual shrunken coverings about each conductor as they emerge from the end cap.

Figure 3A:
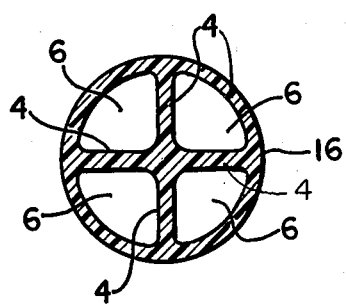
FIG. 3 shows end views A and B of embodiments of channel configurations of the sleeve of the invention.
Figure 3B:
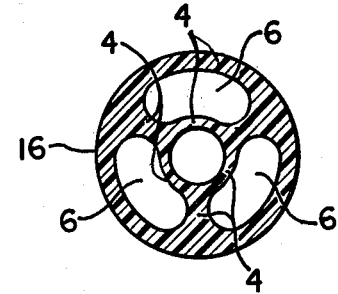

FIG. 3 shows an end view of typical embodiments A and B of sleeve 16 of the invention in the expanded state prior to shrinking. Embodiment A has four channels 6 having substantially the same irregular cross-sectional shape. The channels are separated by internal walls 4 of sleeve 16. Internal walls 4 are integrally related directly or indirectly with wall 4 forming the remainder of sleeve 16. Embodiment B has three channels separated by internal walls 4 that have substantially the same irregular cross-sectional shape disposed about one channel 6 located at the center of sleeve 16 that has a substantially circular cross-sectional shape. Embodiments A and B illustrate that the cross-sectional shape of the one or more channels may have regular or irregular cross-sectional shapes depending on the particular nature of the electrical conductor and/or tube or groups thereof to be contained within the particular channel. Embodiments A and B also illustrate that the walls 4 enclosing each channel 6 may but are not required to have a uniform thickness around a particular channel provided that such walls are adapted to constrict against the outer surface of an electrical conductor and/or tube or groups thereof contained therein in such a manner as to provide a suitable barrier against the flow of gas or vapor through the cable and/or tubing bundle from which the conductors and/or tubes emerge. Embodiments A and B also illustrate that the cross-sectional shape of channels 6 need not necessarily be circular in cross-section in order to contain and have encircling walls that constrict against the outer surface of a conductor, insulated or not, and/or a tube that has a substantially circular cross-sectional shape. It is to be understood that the sleeve of the invention contemplates one or more internal open-ended channels having either regular or irregular cross-sectional shapes or both in the expanded state that are enclosed by walls that are adapted to constrict against the outer surface of an electrical conductor and/or tube or groups thereof contained therein whether or not the conductor and/or tube has a substantially circular cross-sectional shape.

Figure 4:
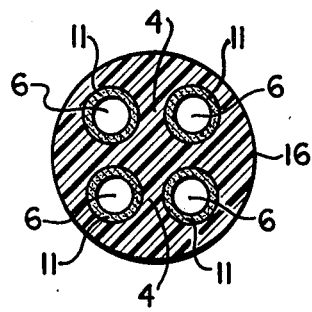
FIG. 4 shows an end view of an embodiment of the sleeve of the invention having an adhesive layer on the inner surface of the channels.

FIG. 4 shows an embodiment of sleeve 16 having four channels 6 separated from each other by internal walls 4 that are directly or indirectly integrally related with the wall 4 forming the remainder of sleeve 16. The internal surface of each wall 4 enclosing each channel 6 is coated with an adhesive 11 that is adapted to bond the inner surface of the wall to the outside surfaces of the particular electrical conductor and/or tubes contained therewithin when the channel wall is constricted thereagainst during the shrinking process. The internal diameter of the inner surface of adhesive coating 11 is sufficiently large to permit the conductor and/or tube contained within the channel to be inserted therethrough when the sleeve is in the expanded state. Depending on the degree of gas or vapor barrier desired and the circumstances involved, such adhesive coatings may be used on the internal surfaces of the walls of any of the one or more internal channels associated with a particular sleeve of the invention. The sleeve of the invention further includes the use of suitably selected adhesives or other coatings on the inner surface of the wall of the previously described cavity 8 and/or on the outer surface of the end of the cable and/or tubing bundle where such is desired to enhance the securement of the sleeve to the bundle or otherwise enhance the effectiveness of the sleeve as a barrier to the flow of gas and vapors through the bundle. Likewise, the sleeve of the invention also includes the use of suitably selected adhesives and/or other coatings on the inner surfaces of the channel walls and/or the outer surface of the conductors and/or tubes contained therewithin where such is desired to enhance the effectiveness of the sleeve as a barrier to the flow of gas and vapors through the bundle.

Figure 5:
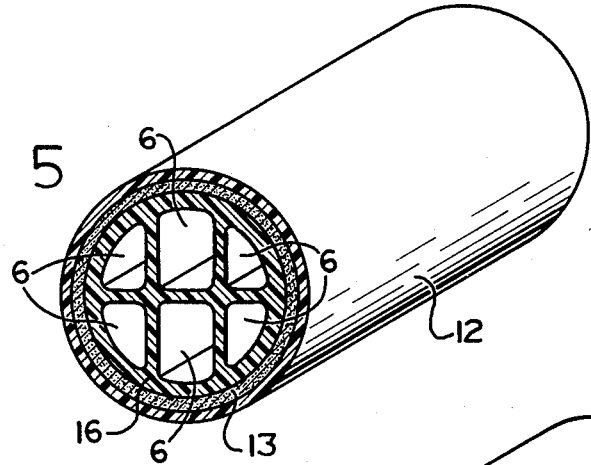
FIG. 5 shows a perspective view of an embodiment of the sleeve of the invention that is held in an expanded state by means of being bonded to a fracturable outer member.

FIG. 5 shows an embodiment of sleeve 16 of the invention held in an expanded state by outer member 12 prior to its securement to the end of a cable and/or tubing bundle. Sleeve 16 has a plurality of channels 6 and is enclosed by member 12. The outer surface of sleeve 16 is secured to the inner surface of member 12 by means of adhesive layer 13 interposed therebetween. Member 12 has an internal diameter sufficient to hold sleeve 16 in a desired expanded configuration and is made from a material sufficiently rigid to ensure that sleeve 16 remains in such expanded state. Adhesive layer 13 is made from any adhesive having the properties desired and able to bond the outer surface of sleeve 16 to the inner surface of member 12 and also able to permit the release of sleeve 16 from member 12 upon the solvation of adhesive 13 or upon the fracturing, solvation, or other means of removing member 12. The embodiment of FIG. 5 illustrates that sleeve 16 of the invention may be held in an expanded state by external means such as member 12 in lieu of its being of the heat recoverable type commonly used in the art which features expanding a member made from suitable heat recoverable material from an originally smaller configuration to an enlarged configuration while heating the member up to or near its crystalline melting point and cooling such member in the expanded configuration such that it will retain such expanded state until such time as it is reheated up to or near its crystalline melting point, upon which, the member will shrink or will attempt to shrink to its original configuration before expansion. Depending upon the preferences or the requirements of a particular application, the sleeve of the present invention may be made from either a heat recoverable material having elastic memory as described above or it may be made from a material having elastic memory held in an expanded configuration by a member such as member 12 of FIG. 5 provided that the material possesses sufficient resiliency to cause the expanded member to return to its original unexpanded configuration upon removal of the means by which it has been held in its expanded state. An example of where it is preferable to use an embodiment of the sleeve of the invention that is held in an expanded configuration rather than being of the heat recoverable type is where the use of heat such as an open flame might present an explosive danger because of the nature of the surrounding environment where the sleeve of the invention is required to be installed. Sleeve 16 may also be held in an expanded state by means of an internal support such as an internal removable mandrel. Further, the inner surface of sleeve 12 may be solvent bonded or melt fused to the outer surface of sleeve 16 to a degree sufficient to hold the sleeve in an expanded state yet permit the release therebetween upon the fracturing, solvation, or other means utilized to cause the removal of member 12.

Figure 6:
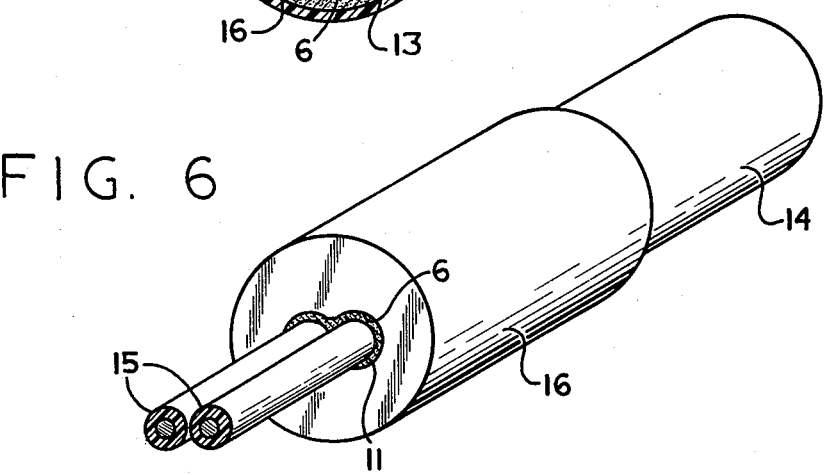
FIG. 6 shows a perspective view of the sleeve of the invention secured to a tubing bundle having a pair of adjacently aligned tubes emerging from a single internal channel in the sleeve.

FIG. 6 shows an embodiment of sleeve 16 in its contracted state secured to the end of tubing bundle 14. Tubing bundle 14 has two adjacent tubes 15 that extend from sleeve 16 through a single channel 6. Adhesive layer 11 is interposed between the outer surface of tubes 15 and the inner surface of channel 6 as a means of enhancing the gas or vapor barrier effectiveness as previously described. The embodiment is illustrative of the fact that the internal channels of the sleeve of the invention may contain more than one tube where such does not prohibit or otherwise inhibit the effectiveness of the sleeve as a barrier to the flow of gas or vapor through the bundle. Likewise, combinations of conductors and tubes may be contained in one or more of the one or more channels associated with the sleeve.

Examples of materials that may be used to make the sleeve of the invention include thermoplastic materials, whether crosslinked or not, such as polyvinyl acetate, polyethylene, polypropylene, polyvinyl chloride, polyamide, polyesters, polyurethanes, halosulfonated polyethylene, halogenated polyethylene, ethylene-propylene-diene rubber, thermoplastic rubber and elastomers and other thermoplastic materials as well as thermosetting materials having the properties desired for a particular application in conjunction with sufficient crystallinity to possess the amount of elastic memory required to cause the sleeve to shrink from an expanded configuration to a contracted configuration sufficient to contract and secure the sleeve to the end of the cable and/or tubing bundle involved and to cause the walls enclosing the one or more internal channels within the sleeve to constrict against the conductors and/or tubes contained therein to provide an effective barrier against the flow of gas or vapor through the bundle.

The materials suitable for use in making the sleeve of the invention may comprise compatible blends of one or more of the heat recoverable or resilient materials having sufficient crystallinity to provide the amount of elastic memory desired and may also include other additives such as colorants, fillers, plasticizers, flame retardants and agents for promoting chemical or irradiation crosslinking such as produced by high energy electrons and the like where such is desirable for a particular application.

Methods for making the sleeve of the invention include both molding and extrusion. One method of making the sleeve of the invention is where (1) a heat recoverable chemically crosslinkable flame retardant polyethylene composition is injected under heat into a die designed to provide a cavity diameter at one end of the sleeve that is smaller than the outer diameter of an electrical cable and/or tubing bundle to which the sleeve is to be secured and to provide one or more internal spaced-apart open-ended channels at the other end communicating with the cavity that in number are sufficient to contain the combination of cables, tubes and/or conductors contained within the bundle in the manner desired and have a diameter smaller than the outer diameter of the particular cable, conductor and/or tube or combinations thereof to be inserted through a particular channel; (2) crosslinking the molded sleeve while in the die or subsequent to its removal therefrom by the use of the required amount of heat for a sufficient period of time to promote such crosslinking; (3) expanding the cavity and channels of the sleeve while heating the sleeve up to or near its crystalline melting point by suitable means, such as by the use of a shaped mandrel that will expand the cavity of the sleeve to a diameter larger than the outer diameter of the cable and will expand the one or more channels to a diameter larger than the outer diameter of the particular conductor, cable and/or tubes or combinations thereof to be inserted through the channel; (4) cooling the expanded sleeve by suitable means to a point where it is able to retain its expanded configuration without the support of the mandrel; and (5) removing the mandrel from the sleeve.

In the case where the sleeve of the invention is extruded into indeterminate lengths, provisions would have to be made either during or subsequent to the extrusion process to provide the sleeve length required and to provide the previously described cavity at one end of the sleeve such as for example by trimming away a suitable amount of the internal channel walls at one end of the sleeve.

What is claimed is:

1. A compact one-piece shrinkable unbranched sleeve made from a recoverable material having an elastic memory and having an outer wall extending along the entire length thereof and which, while in an expanded state, is able to be secured to the end of a bundle having one or more components extending from the end thereof to provide a barrier of minimal outside dimension to the flow of gas or vapors through the bundle, said sleeve in the expanded state having an opening disposed at one end thereof that is adapted to permit insertion of the end of the bundle into a cavity disposed within the sleeve communicating with the opening, said cavity enclosed by the outer wall of the sleeve and in said expanded state adapted to receive the end of the bundle and having a length thereof extending along the length of the sleeve that is sufficient to insure the securement of the sleeve to the bundle;

A plurality of channels disposed internally within the outer wall of the sleeve that extend along the length thereof between the cavity and the end of the sleeve opposite to the end into which the bundle is inserted, said channels having an opening at one end thereof communicating with the cavity and an opening at the opposite end, said channels surrounded by the outer wall of the sleeve and enclosed by inner walls of the sleeve that are integrally related directly or indirectly with the outer wall forming the remainder of the sleeve, said channels in the expanded state adapted to receive the components from the cavity in the combinations thereof desired and having sufficient length to permit the components to extend therethrough and emerge from the opening thereof at the opposite end; and said sleeve dimensionally adapted such that when the sleeve is caused to shrink from the expanded state onto the end of the bundle the outer wall of the sleeve surrounding the cavity is able to contract against the outer surface of the bundle to secure the engagement therebetween and the remainder of the outer wall of the sleeve surrounding the channels in combination with the inner walls enclosing the channels are able to constrict against the outer surface of the components contained therein to provide a barrier to the flow of gas or vapors through the bundle.

2. The sleeve of claim 1 wherein the recoverable material is a heat recoverable material whereby the sleeve is caused to shrink by the application of heat.

3. The sleeve of claim 1 wherein the recoverable material is a resilient material and the sleeve includes a non-recoverable member adapted to hold the sleeve in said expanded state.

4. The sleeve of claim 1 including an adhesive or other coating disposed on the inner surface of the channel walls as a means of bonding the channel walls to said conductors tubes or otherwise enhance the effectiveness of the sleeve as a barrier to the flow of gas and vapors through the bundle upon said constriction of the channel walls.

5. The sleeve of claims 1 or 4 including an adhesive or other coating disposed on the inner surface of the cavity wall as a means of bonding the inner surface of the cavity wall to the outer surface of the bundle or otherwise enhance the effectiveness of the sleeve as a barrier to the flow of gas and vapors through the bundle upon said contraction of the cavity wall.

6. The sleeve of claim 1 wherein the material is a crosslinked material.

7. The sleeve of claim 1 wherein the material is a flame retardant material.

8. The sleeve of claim 6 wherein the crosslinked material is a flame retardant crosslinked material.

9. The sleeve of claim 8 wherein the crosslinked flame retardant material is a polyethylene composition.

10. The sleeve of claim 8 wherein the crosslinked flame retardant material is an ethylene-propylene diene rubber composition.

11. The sleeve of claim 8 wherein the flame retardant material is a polyvinyl acetate composition.

12. The sleeve of claim 6 wherein the crosslinked material is a chemically crosslinked material.

13. The sleeve of claim 6 wherein the crosslinked material is a radiation crosslinked material.

14. The sleeve of claim 13 wherein the radiation is in the form of high energy electrons.

15. The sleeve of claim 1 wherein the components are electrical conductors.

16. The sleeve of claim 1 wherein the components are tubes.

17. The sleeve of claim 1 wherein the components are both electrical conductors and tubes.

* * * * *